(12) United States Patent
Choi

(10) Patent No.: US 10,628,023 B2
(45) Date of Patent: Apr. 21, 2020

(54) MOBILE TERMINAL PERFORMING A SCREEN SCROLL FUNCTION AND A METHOD FOR CONTROLLING THE MOBILE TERMINAL

(71) Applicant: LG ELECTRONICS INC., Seoul (KR)

(72) Inventor: Kyungdong Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 167 days.

(21) Appl. No.: 15/348,406

(22) Filed: Nov. 10, 2016

(65) Prior Publication Data

US 2017/0139565 A1  May 18, 2017

(30) Foreign Application Priority Data

Nov. 12, 2015 (KR) ........................ 10-2015-0158808

(51) Int. Cl.
| | |
|---|---|
| G06F 3/0485 | (2013.01) |
| G06F 3/0483 | (2013.01) |
| G06F 3/01 | (2006.01) |
| G06F 3/041 | (2006.01) |
| G06F 3/0487 | (2013.01) |
| G06F 3/0488 | (2013.01) |

(52) U.S. Cl.
CPC ............ *G06F 3/0485* (2013.01); *G06F 3/016* (2013.01); *G06F 3/041* (2013.01); *G06F 3/0483* (2013.01); *G06F 3/0487* (2013.01); *G06F 3/04883* (2013.01); *G06F 2203/014* (2013.01); *G06F 2203/04105* (2013.01); *G06F 2203/04108* (2013.01)

(58) Field of Classification Search
CPC .................. G06F 3/0487; G06F 3/016; G06F 2203/04105; G06F 2203/014; G06F 3/04883; G06F 3/0483
USPC ........................................................ 715/702
See application file for complete search history.

(56) References Cited

U.S. PATENT DOCUMENTS

| | | | |
|---|---|---|---|
| 2003/0043123 A1* | 3/2003 | Hinckley ................ G06F 3/021 345/173 |
| 2003/0098885 A1* | 5/2003 | Yabe .................... G06F 3/0485 715/785 |
| 2006/0132457 A1* | 6/2006 | Rimas-Ribikauskas .................... G06F 3/04842 345/173 |
| 2006/0236262 A1* | 10/2006 | Bathiche ................ G06F 3/016 715/786 |
| 2008/0155461 A1* | 6/2008 | Ozaki ................... G06F 3/0485 715/784 |

(Continued)

FOREIGN PATENT DOCUMENTS

| | | | | |
|---|---|---|---|---|
| EP | 2879037 A1 * | 6/2015 | ........... G06F 3/0414 |
| JP | 2006285157 A * | 10/2006 | .............. G06F 3/011 |

(Continued)

*Primary Examiner* — Li P Sun
*Assistant Examiner* — Henry Orr
(74) *Attorney, Agent, or Firm* — Birch, Stewart, Kolasch & Birch, LLP

(57) ABSTRACT

Disclosed herein is a method for controlling a mobile terminal. The method includes displaying an operation screen on a display unit, receiving a touch input for a predetermined time on the display unit, and scrolling the operation screen in a direction corresponding to a location of the display unit where the touch input is received.

6 Claims, 18 Drawing Sheets

(56) References Cited

U.S. PATENT DOCUMENTS

| | | | | |
|---|---|---|---|---|
| 2009/0103250 | A1* | 4/2009 | Takashima | H05K 9/00 361/679.02 |
| 2010/0005390 | A1* | 1/2010 | Bong | G06F 3/0414 715/702 |
| 2010/0088632 | A1* | 4/2010 | Knowles | G06F 3/0485 715/784 |
| 2010/0321312 | A1* | 12/2010 | Han | G06F 1/1694 345/173 |
| 2011/0050591 | A1* | 3/2011 | Kim | G06F 3/0488 345/173 |
| 2011/0050629 | A1* | 3/2011 | Homma | G06F 3/0414 345/174 |
| 2011/0084914 | A1* | 4/2011 | Zalewski | G06F 3/043 345/173 |
| 2011/0169743 | A1* | 7/2011 | Oh | H04M 1/22 345/169 |
| 2011/0202889 | A1* | 8/2011 | Ludwig | G06F 3/04815 715/856 |
| 2011/0214088 | A1* | 9/2011 | Sandru | G09G 5/346 715/785 |
| 2011/0296334 | A1* | 12/2011 | Ryu | G06F 3/0483 715/776 |
| 2011/0300910 | A1* | 12/2011 | Choi | G06F 3/0482 455/566 |
| 2012/0089942 | A1* | 4/2012 | Gammon | G06F 3/048 715/784 |
| 2012/0105358 | A1* | 5/2012 | Momeyer | G06F 3/0414 345/174 |
| 2012/0242602 | A1* | 9/2012 | Choi | G06F 3/0488 345/173 |
| 2012/0274662 | A1* | 11/2012 | Kim | G06F 3/0488 345/650 |
| 2013/0113715 | A1* | 5/2013 | Grant | G06F 3/0488 345/173 |
| 2013/0127765 | A1* | 5/2013 | Behdasht | G06F 3/041 345/173 |
| 2013/0335319 | A1* | 12/2013 | Balasundaram | G06F 3/0488 345/156 |
| 2014/0253522 | A1* | 9/2014 | Cueto | G06F 3/03545 345/179 |
| 2014/0292668 | A1* | 10/2014 | Fricklas | G06F 3/041 345/173 |
| 2014/0340323 | A1* | 11/2014 | Jang | G06F 3/0416 345/173 |
| 2015/0347002 | A1* | 12/2015 | Motoi | G06F 3/044 345/174 |
| 2016/0035119 | A1* | 2/2016 | Lee | G06F 3/0485 345/473 |

FOREIGN PATENT DOCUMENTS

| | | |
|---|---|---|
| JP | 2011-170775 A | 9/2011 |
| KR | 10-2001-0061340 A | 7/2001 |
| KR | 10-2011-0130956 A | 12/2011 |
| KR | 10-2015-0122021 A | 10/2015 |

* cited by examiner

FIG. 3
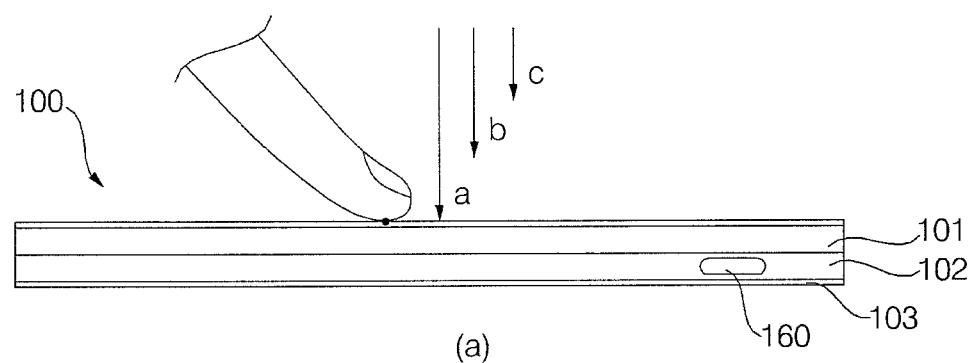
(a)
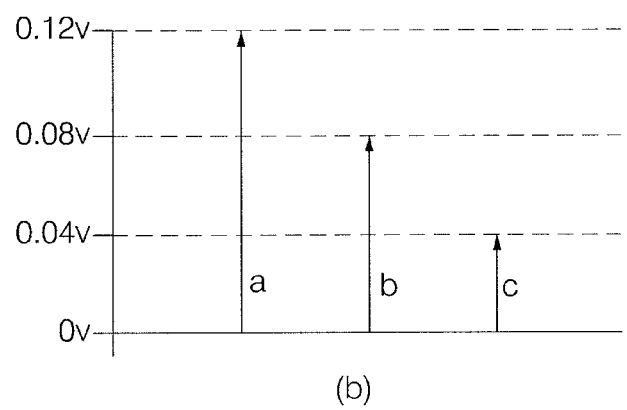
(b)

MOBILE TERMINAL PERFORMING A SCREEN SCROLL FUNCTION AND A METHOD FOR CONTROLLING THE MOBILE TERMINAL

CROSS-REFERENCE TO RELATED APPLICATION

This application claims priority to Korean Patent Application No. 10-2015-0158808 filed on Nov. 12, 2015 in Korea, the entire contents of which is hereby incorporated by reference in its entirety.

BACKGROUND OF THE DISCLOSURE

1. Field of the Disclosure

The present invention relates to a mobile terminal and a method for controlling the same and, more particularly, to a mobile terminal, which may simply perform a screen scroll function, and a method for controlling the mobile terminal.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

However, since mobility and portability should be considered, mobile terminals are limited in space allocation for disposing a user interface, such as a display or a keypad.

Therefore, in order to conveniently use various and complicated functions provided by mobile terminals, operation of the mobile terminals needs to be controlled through a new input/output method differing from a convention input/output method.

SUMMARY OF THE DISCLOSURE

Accordingly, an object of the present invention is to address the above-noted and other problems.

Another object of the present invention is to provide a novel mobile terminal which may simply control at least one of a scroll direction and a scroll speed of an operation screen in response to a predetermined user input, and a method for controlling the mobile terminal.

To achieve these and other advantages and in accordance with the purpose of the present invention, as embodied and broadly described herein, the present invention provides in one aspect a method for controlling a mobile terminal according to an exemplary embodiment of the present invention, including displaying an operation screen on a display unit, receiving a touch input for a predetermined time on the display unit, and scrolling the operation screen in a direction corresponding to a location of the display unit where the touch input is received.

In another aspect, the present invention provides a mobile terminal according to an exemplary embodiment of the present invention, including a display unit configured to display an operation screen, and a controller configured, when a touch input is received for a predetermined time on the display unit, to scroll the operation screen in a direction corresponding to a location of the display unit where the touch input is received.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 3 is a conceptual view schematically illustrating the intensity of pressure of touch input applied to the touchscreen;

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
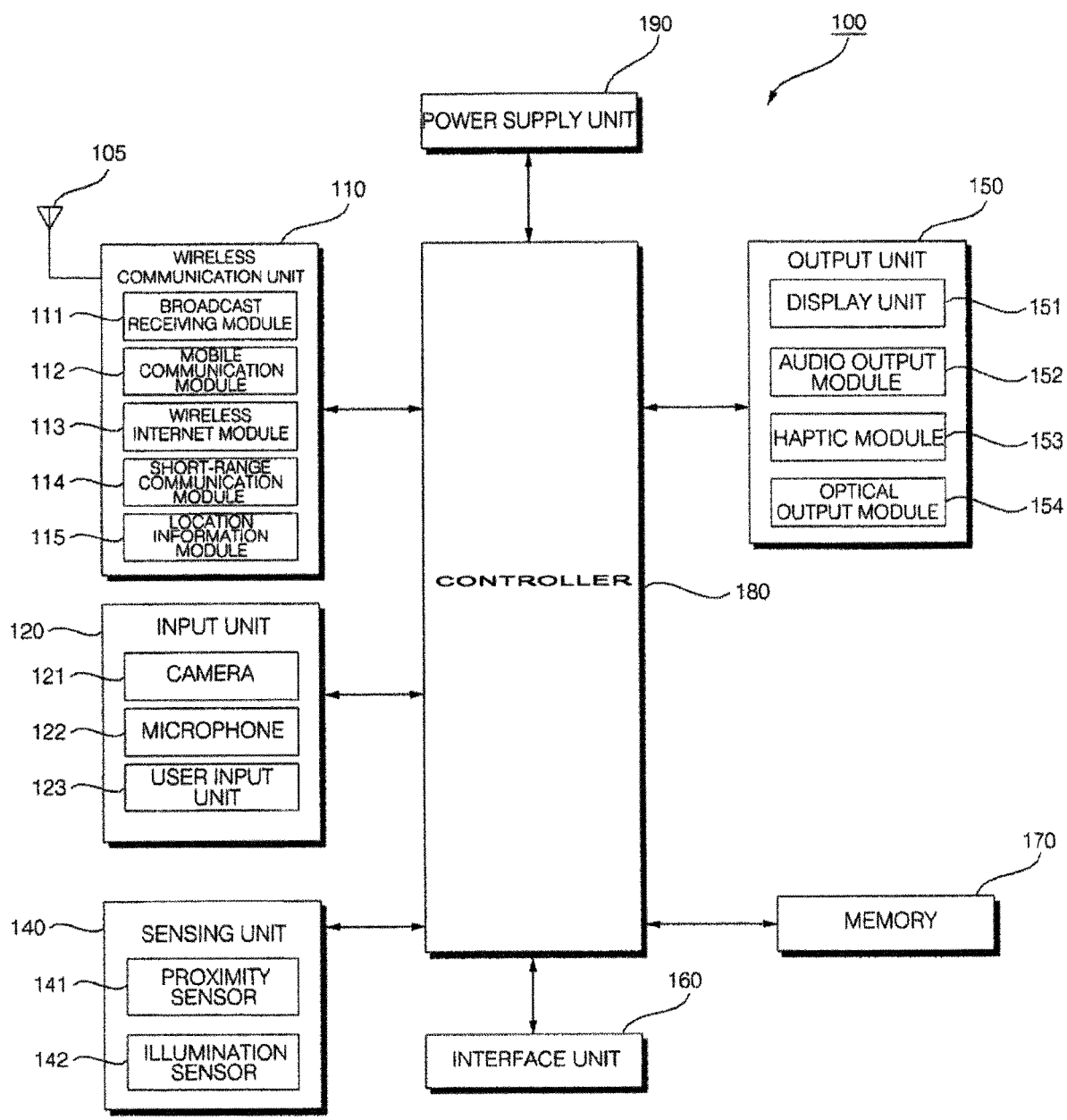
FIG. 1a is a block diagram of a mobile terminal in accordance with the present disclosure.
Figure 1B:
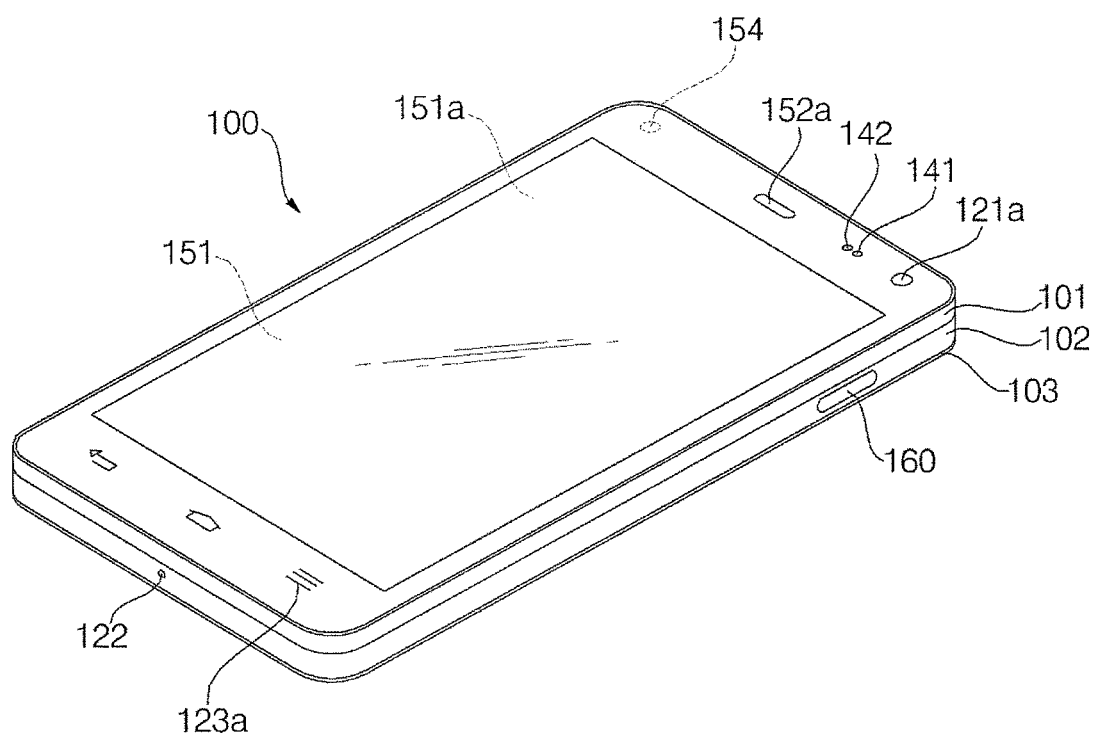
FIGS. 1b and 1c are conceptual views of one example of the mobile terminal, viewed from different directions.
Figure 1C:
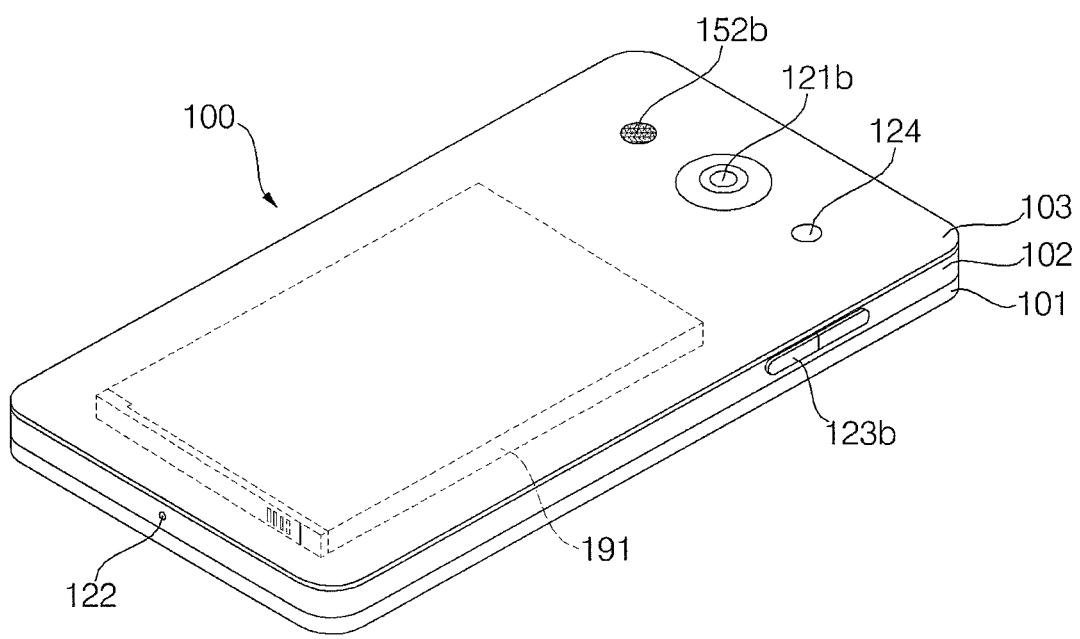

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communication between a mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating a use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100.

The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1*c*, a flash 124 is shown adjacent to the second camera 121*b*. When an image of a subject is captured with the camera 121*b*, the flash 124 may illuminate the subject.

As shown in FIG. 1*b*, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

As above, the configuration of the mobile terminal 100 in accordance with the present invention has been described with reference to FIGS. 1*a* to 1*c*. Hereinafter, a mobile terminal which may simply control at least one of a scroll direction and a scroll speed of an operation screen in response to a predetermined user input, and a method for controlling the mobile terminal in accordance with one embodiment of the present invention will be described in detail.

Figure 2:
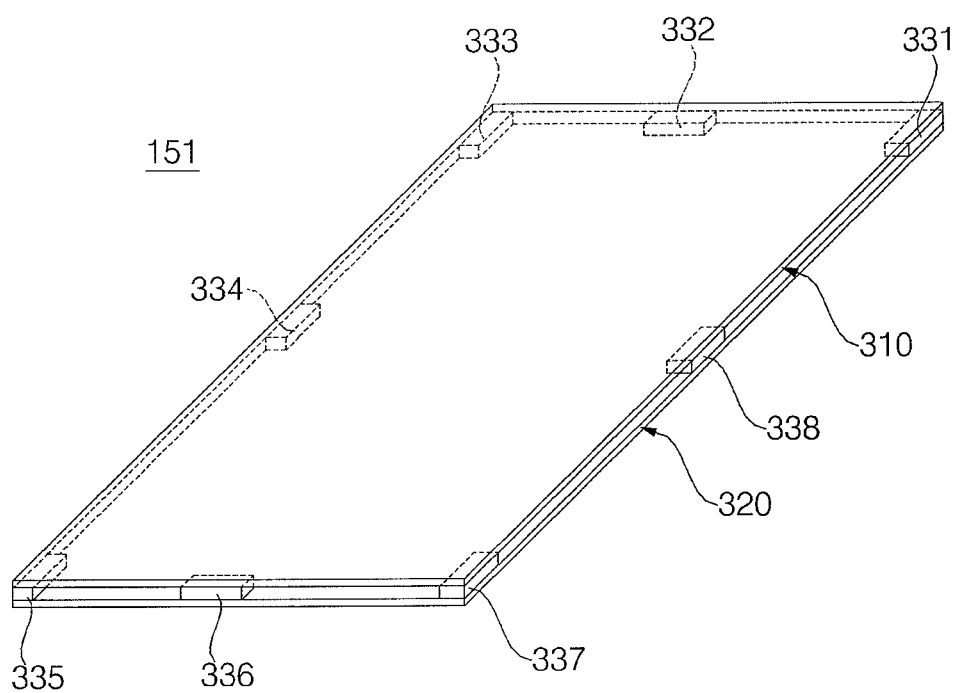
FIG. 2 is a perspective view illustrating a structure of a touchscreen in accordance with one embodiment of the present invention.

FIG. 2 is a perspective view illustrating a structure of a touchscreen in accordance with one embodiment of the present invention.

With reference to FIG. 2, a touchscreen 151 includes a display surface 320 of a display apparatus to visually output an image, a touch sensor (or a touch panel) 310 disposed in parallel with the display surface 320 and contacting a user's finger, and one or more pressure sensors 331 to 338 to sense a pressure acting on the touch sensor 310 and to output electrical pressure sensing signals. Here, the one or more pressure sensors 331 to 338 may function as spacers disposed between the display surface 320 and the touch sensor 310 to separate the display surface 320 and the touch sensor 310 from each other by a designated interval. In another embodiment, the one or more pressure sensors 331 to 338 may be disposed below the rear surface of the display apparatus (i.e., a display panel). Also, a plurality of pressure sensors may be formed in a panel type (or a module type) having a rectangular shape.

Although this embodiment exemplarily illustrates eight pressure sensors 331 to 338 as being disposed at the respective corners of the touchscreen 151 and at the centers of the respective sides of the touchscreen 151, the disclosure is not limited thereto. Therefore, only four pressure sensors may be disposed at the respective corners or on the respective sides of the touchscreen 151. Otherwise, only one pressure sensor may be disposed at one corner or on one side of the touchscreen 151. Otherwise, pressure sensors may be disposed at positions deviating from the centers of the respective sides as well as at the centers of the respective sides.

Although, in this embodiment, the pressure sensors 331 to 338 disposed between the touch sensor 310 and the display surface 320 of the display apparatus are used as spacers, separate elastic (or non-elastic) spacers may be additionally disposed. For example, a plurality of pressure sensors may be disposed at the respective corners of the touch sensor 310 and a plurality of spacers may be disposed on the respective sides of the touch sensor 310. Further, pressure sensors and spacers may be disposed in parallel so as to form one part and be thus properly disposed on the touch sensor 310.

If the touchscreen 151 having the above-described structure is touched by a user's finger or a stylus pen, the controller 180 may calculate a touch pressure applied by the corresponding finger or stylus pen using the one or more pressure sensors 331 to 338 disposed at the corners and/or on the sides of the touchscreen 151.

In another embodiment, the touchscreen 151 may measure the intensity of touch pressure applied to the touchscreen 151 using the touch sensor 310 without use of separate pressure sensors. In this case, the touch sensor 310 may sense the intensity of touch pressure applied to the touchscreen 151 using at least one of various touch types, such as a resistive type, a capacitive type, an infrared type, an ultrasonic type, a magnetic field type, etc.

As one example, the touch sensor 310 may calculate the pressure of touch input based on variation of a resistance value, a capacitance or a touch area generated at a specific region of the touchscreen 151. As another example, the touch sensor 310 may calculate the pressure of touch input based on a degree of bending of the touchscreen 151.

FIG. 3 is a conceptual view schematically illustrating the intensity of pressure of touch input applied to the touchscreen. That is, (a) of FIG. 3 is a side view illustrating user actions touching the touchscreen 151 in different pressures and (b) of FIG. 3 is a graph converting the intensities of pressures of touch inputs applied to the touchscreen 151 into voltages.

With reference to (a) of FIG. 3, if the touchscreen 151 is touched by a user's finger or a stylus pen, the user of the mobile terminal 100 may apply touch pressures having different intensities a, b, and c to the touchscreen 151. In this case, piezoelectric elements constituting the touchscreen 151 sense the intensity of pressure of touch input and thus generate a touch signal. Here, the piezoelectric elements may be the above-described one or more pressure sensors 331 to 338 or touch sensor 310.

The piezoelectric elements may generate a touch signal such that the sensed intensity of touch pressure and the intensity of voltage are in direct proportion to each other. As exemplarily shown in the graph of (b) of FIG. 3, the piezoelectric elements may generate a touch signal (a) having a voltage belonging to 0.08V to 0.12V if touch input having the highest pressure intensity is received, generate a touch signal (b) having a voltage belonging to 0.04V to 0.08V if touch input having an intermediate pressure intensity is received, and generate a touch signal (c) having a voltage of 0.04V or less if touch input having the lowest pressure intensity is received.

However, it is understood by those skilled in the art that, as needed, the intensities of touch pressures are not divided into a predetermined number of voltage sections but the respective touch pressures may be converted into numerical values and used as input values for controlling designated operations.

Figure 4:
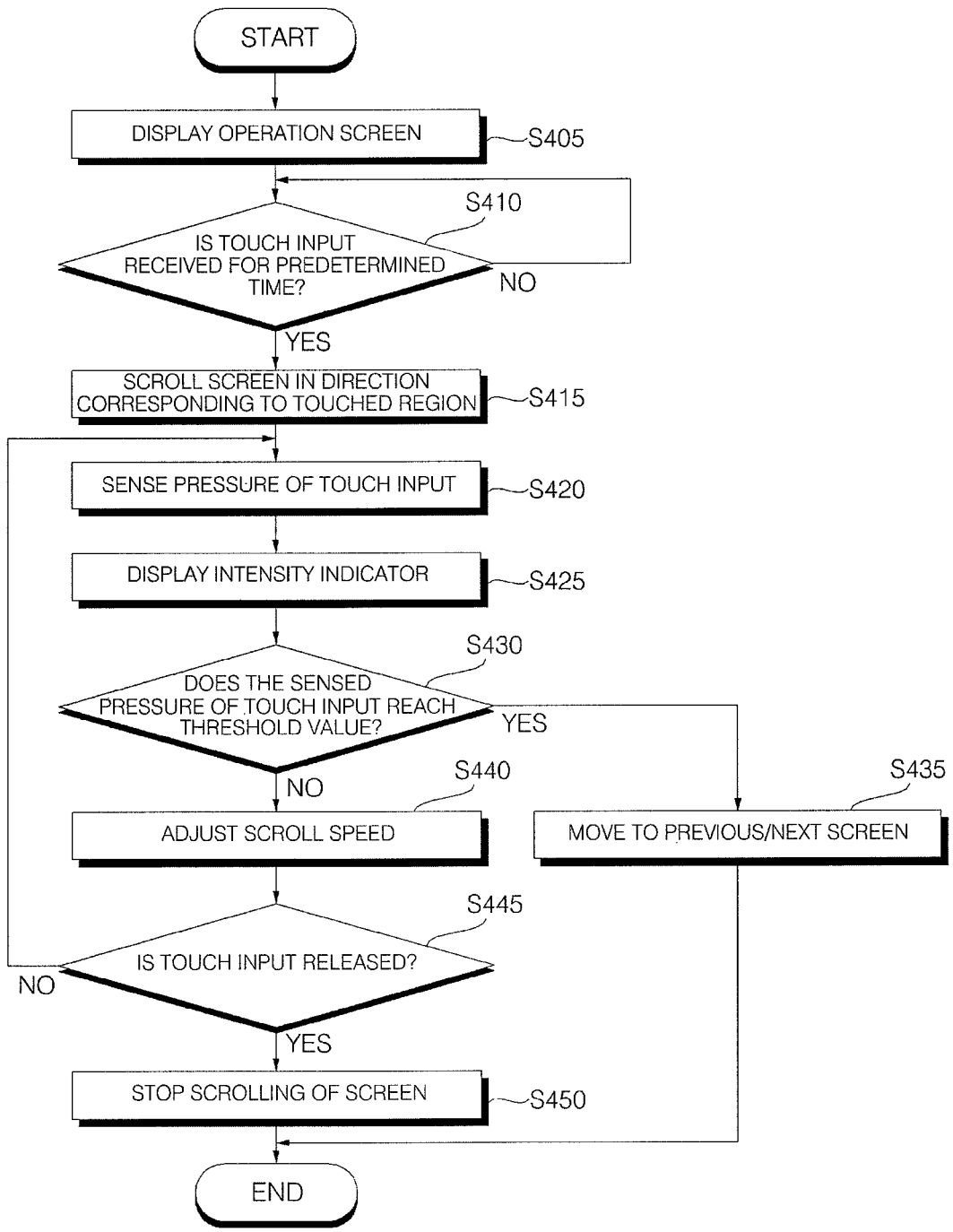
FIG. 4 is a flowchart illustrating an operation of a mobile terminal in accordance with a first embodiment of the present invention.

FIG. 4 is a flowchart illustrating an operation of a mobile terminal in accordance with a first embodiment of the present invention.

With reference to FIG. 4, the controller 180 displays an operation screen corresponding to a menu or an operation selected by a user command on the display unit 151 (Operation S405). Here, the operation screen displayed on the display unit 151 is a screen which is scrollable according to user input. For example, the operation screen may be an image/content/call/message/e-mail list screen, a broadcast screen, a map screen, a web page screen, or an execution screen of various applications.

Under the display state of the scrollable operation screen, if a user input of touching a point of the display unit 151 is received for a predetermined time (Operation S410), the controller 180 scrolls the operation screen in a direction corresponding to a region (or a location) where a touch input of the user is received (Operation S415). Here, the controller 180 may display an indicator to indicate the scroll direction of the operation screen on the display unit 151. Such a screen scrolling operation may be continued while a long touch input of the user is maintained.

That is, if touch input is received from the lower portion (or region) of the display unit 151, the controller 180 may slowly scroll the operation screen in the downward direction. On the other hand, if touch input is received from the upper portion (or region) of the display unit 151, the controller 180 may slowly scroll the operation screen in the upward direction.

Here, the upper and lower portions of the display unit 151 may be distinguished based on a horizontal line traversing the center of the display unit 151. That is, a region located above the horizontal line traversing the center of the display unit 151 may correspond to the upper portion of the display unit 151 and a region located under the horizontal line may correspond to the lower portion of the display unit 151. Otherwise, the upper and lower portions of the display unit 151 may be distinguished by equally dividing the display unit 151 into three sections in a direction perpendicular to a display direction of the display unit 151. That is, among regions acquired by equally dividing the display unit 151 into three sections, the uppermost region may correspond to the upper portion of the display unit 151 and the lowermost region may correspond to the lower portion of the display unit 151.

If the operation screen is a screen which is scrollable in the horizontal direction, the controller 180 may slowly scroll the operation screen in the leftward direction in response to touch input received through the left region of the display unit 151. On the other hand, the controller 180 may slowly scroll the operation screen in the rightward direction in response to touch input received through the right region of the display unit 151.

Here, the left and right regions of the display unit 151 may be distinguished based on a vertical line traversing the center of the display unit 151. That is, a region located at the left side of the vertical line traversing the center of the display unit 151 may correspond to the left region of the display unit 151 and a region located at the right side of the vertical line may correspond to the right region of the display unit 151. Otherwise, the left and right regions of the display unit 151 may be distinguished by equally dividing the display unit 151 into three sections in a direction parallel to a display direction of the display unit 151. That is, among regions acquired by equally dividing the display unit 151 into three sections in the horizontal direction, the region located at the leftmost position may correspond to the left region of the display unit 151 and the region located at the rightmost position may correspond to the right region of the display unit 151.

Further, in another embodiment, in order to avoid collision with an option menu pop-up operation or an editing menu pop-up operation according to conventional long touch input, the scrolling operation in accordance with the present invention may be operated only if the long touch input is received through a vacant space of the operation screen or if the long touch input is received through a specific region of the operation screen or a specific icon.

When the screen scrolling operation is carried out, the controller 180 senses the intensity of pressure of touch input applied to the display unit 151 (Operation S420). Here, the intensity of pressure of the touch input may be classified into a predetermined number of pressure levels. That is, the intensity of pressure of the touch input may be classified into three pressure levels and it is understood by those skilled in the art that the intensity of pressure of the touch input may be classified into a smaller number of or larger number of pressure levels.

The controller 180 displays an indicator to indicate the sensed intensity of pressure of touch input (hereinafter, referred to an "intensity indicator" for convenience) on the display unit 151 (Operation S425). Here, the intensity indicator may be displayed at a point, through which user touch input is received, or a region adjacent to the point.

Further, when pressure of touch input is sensed, the controller 180 may control the haptic module 153 to output a vibration pattern corresponding to the sensed intensity of pressure of the touch input. Thereby, a user may easily recognize the intensity of pressure of the touch input through the intensity indicator displayed on the display unit 151 or the vibration pattern transmitted from the mobile terminal 100.

The controller 180 checks (or identifies) whether or not the intensity of pressure of the touch input applied to the display unit 151 reaches a predetermined critical (threshold) value (Operation S430). Here, the critical value may be a pressure level having the highest intensity among a plurality of predetermined pressure levels but is not limited thereto.

As a result of check of Operation S430, if the intensity of pressure of the touch input reaches the predetermined critical value, the controller 180 displays the previous screen or the next screen of the current operation screen on the display unit 151 (Operation S435).

That is, if the intensity of pressure of touch input received through the lower portion of the display unit 151 reaches the critical value, the controller 180 may display the next screen of the current operation screen on the display unit 151. On the other hand, if the intensity of pressure of touch input received through the upper portion of the display unit 151 reaches the critical value, the controller 180 may display the previous screen of the current operation screen on the display unit 151.

Further, if there is no previous or next screen of the current operation screen, the controller 180 may display a notification message indicating that there is no corresponding screen on the display unit 151.

As a result of check of Operation S430, if the intensity of pressure of the touch input does not reach the predetermined critical value, the controller 180 adjusts the screen scroll speed based on the intensity of pressure of the touch input (Operation S440). That is, the controller 180 may gradually decrease the screen scroll speed as the sensed intensity of pressure of the touch input is decreased, and gradually increase the screen scroll speed as the sensed intensity of pressure of the touch input is increased.

Further, the controller 180 may further display an indicator to indicate the current screen scroll speed on the display unit 151.

Thereafter, if the touch input received through one point of the display unit 151 is released (Operation S445), the controller 180 stops scrolling of the operation screen (Operation S450). On the other hand, if the touch input is not released, the controller 180 repeatedly performs the above Operations S420 to S440.

Figure 5:
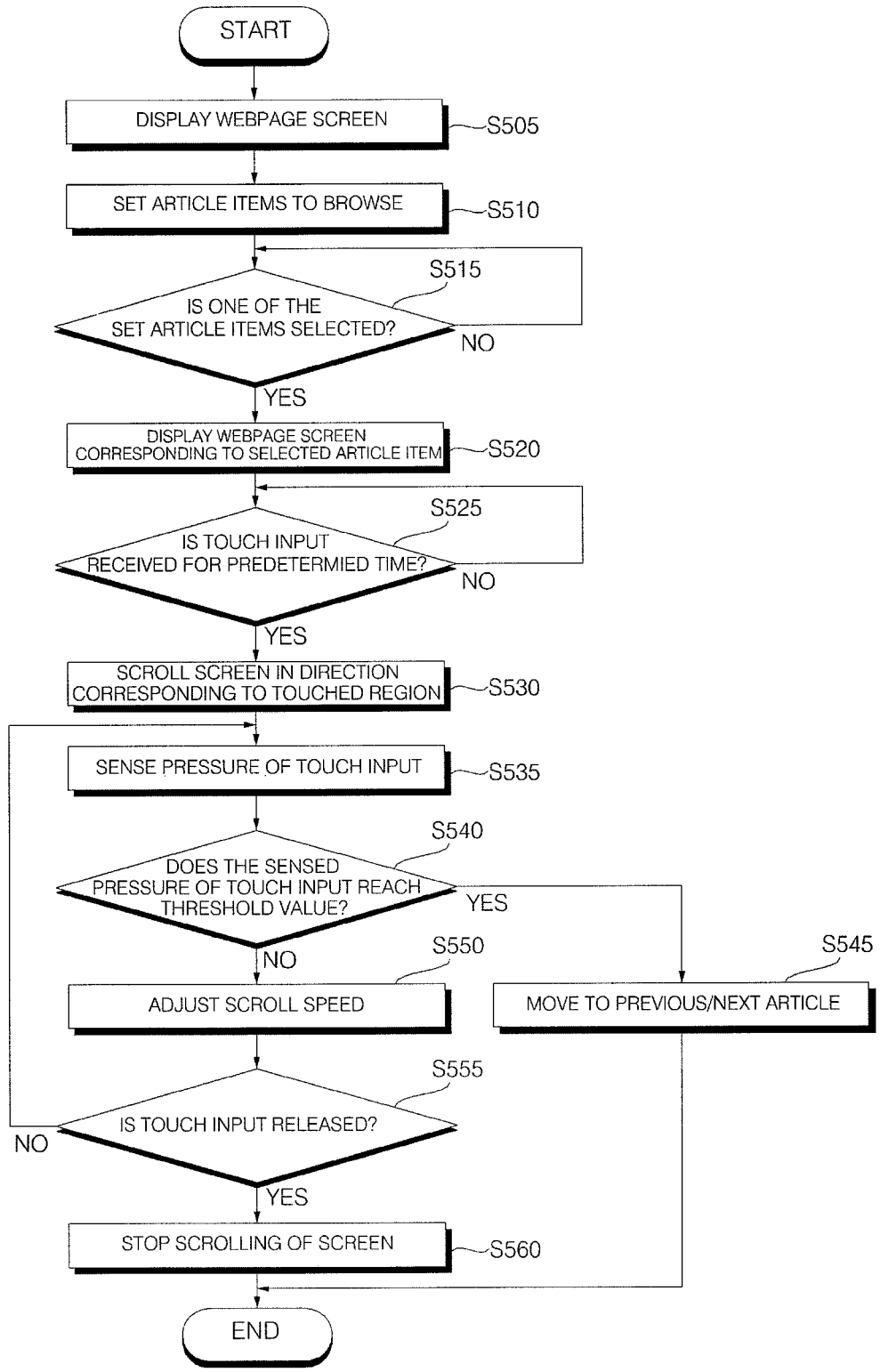
FIG. 5 is a flowchart illustrating an operation of a mobile terminal in accordance with a second embodiment of the present invention.

FIG. 5 is a flowchart illustrating an operation of a mobile terminal in accordance with a second embodiment of the present invention.

With reference to FIG. 5, the controller 180 drives a web browser according to a user command and is thus connected to a predetermined portal site. The controller 180 displays a home page screen (or an initial web page screen) provided by the connected portal site on the display unit 151 (Operation S505). Here, the home page screen may include a plurality of category menus indicating categories of content in the corresponding screen and a plurality of article items belonging to any one of the category menus.

Under the display state of the home page screen, if a general touch input is received through any one of the article items, the controller 180 may display a web page screen corresponding to the touched article item on the display unit 151.

On the other hand, if a pressure touch input is received through at least one of the article items, the controller 180 sets the touched article items as article items to browse (Operation S510). Here, the controller 180 may display a predetermined indicator at the set article items so that a user may recognize that the corresponding article items are set as article items to browse.

Further, if a pressure touch input is received through at least one of the category menus, the controller may set all article items belonging to the touched category menu as article items to browse.

Although this embodiment exemplarily illustrates that article items to browse are set through the pressure touch input under the display state of the home page screen, the disclosure is not limited thereto. Therefore, it is understood by those skilled in the art that other types of touch inputs may be used instead of pressure touch input. Also, it is understood by those skilled in the art that article items to browse may be set in advance on the corresponding home page screen through a separate setting menu.

If one article item is selected from the article items set through the above-described pressure touch input (Operation S515), the controller 180 displays a web page screen (or a lower web page screen) corresponding to the selected article item on the display unit 151 (Operation S520).

Under the display state of the web page screen, if user input of touching a point of the display unit 151 is received for a predetermined time (Operation S525), the controller 180 scrolls the web page screen in a direction corresponding to a region where the touch input of the user is received (Operation S530)

That is, if the touch input is received from the lower portion of the display unit 151, the controller 180 may scroll the web page screen in the downward direction. On the other hand, if touch input is received from the upper portion of the display unit 151, the controller 180 may scroll the web page screen in the upward direction. Such a screen scrolling operation may be continued while a long touch input of the user is maintained.

When the screen scrolling operation is carried out, the controller 180 senses the intensity of pressure of touch input applied to the display unit 151 (Operation S535). Here, the controller 180 displays an intensity indicator to indicate the sensed intensity of pressure of the touch input on the display unit 151.

The controller 180 checks (or identifies) whether or not the intensity of pressure of the touch input reaches a predetermined critical value (Operation S540). Here, the critical value may be a pressure level having the highest intensity among a plurality of predetermined pressure levels but is not limited thereto.

As a result of check of Operation S540, if the intensity of pressure of the touch input reaches the predetermined critical value, the controller 180 displays a web page screen corresponding to the previous article item or the next article item of the currently selected article item on the display unit 151 (Operation S545). Here, the previous or next article item may be one of the article items set in advance through the above-described pressure touch input.

That is, if the intensity of pressure of touch input received through the lower portion of the display unit 151 reaches the critical value, the controller 180 may display a web page screen corresponding to the next article item on the display unit 151. On the other hand, if the intensity of pressure of touch input received through the upper portion of the display unit 151 reaches the critical value, the controller 180 may display a web page screen corresponding to the previous article item on the display unit 151.

On the other hand, as a result of check of Operation S540, if the intensity of pressure of the touch input does not reach the predetermined critical value, the controller 180 adjusts the screen scroll speed in proportion to the intensity of pressure of the touch input (Operation S550). That is, the controller 180 may gradually decrease the screen scroll speed as the sensed intensity of pressure of the touch input is decreased and gradually increase the screen scroll speed as the sensed intensity of pressure of the touch input is increased.

Thereafter, if the touch input received through one point of the display unit 151 is released (Operation S555), the controller 180 stops scrolling of the web page screen (Operation S560). On the other hand, if the touch input is not released, the controller 180 repeatedly performs the above Operations S535 to S550.

It is understood by those skilled in the art that, in this embodiment, the process of setting article items to browse (i.e., Operations S510 to S520) may be omitted. In this case, the previous or next article item may be a previous or a next article item of the article item corresponding to the currently scrolled web page screen.

As described above, the mobile terminals in accordance with the first and second embodiments scroll the operation screen in a direction corresponding to a position of the display unit where a long touch input of the user is received, and vary the scroll speed of the operation screen according to the intensity of pressure of the long touch input, and may thus provide user convenience differentiated from conventional mobile terminals.

Figure 6:
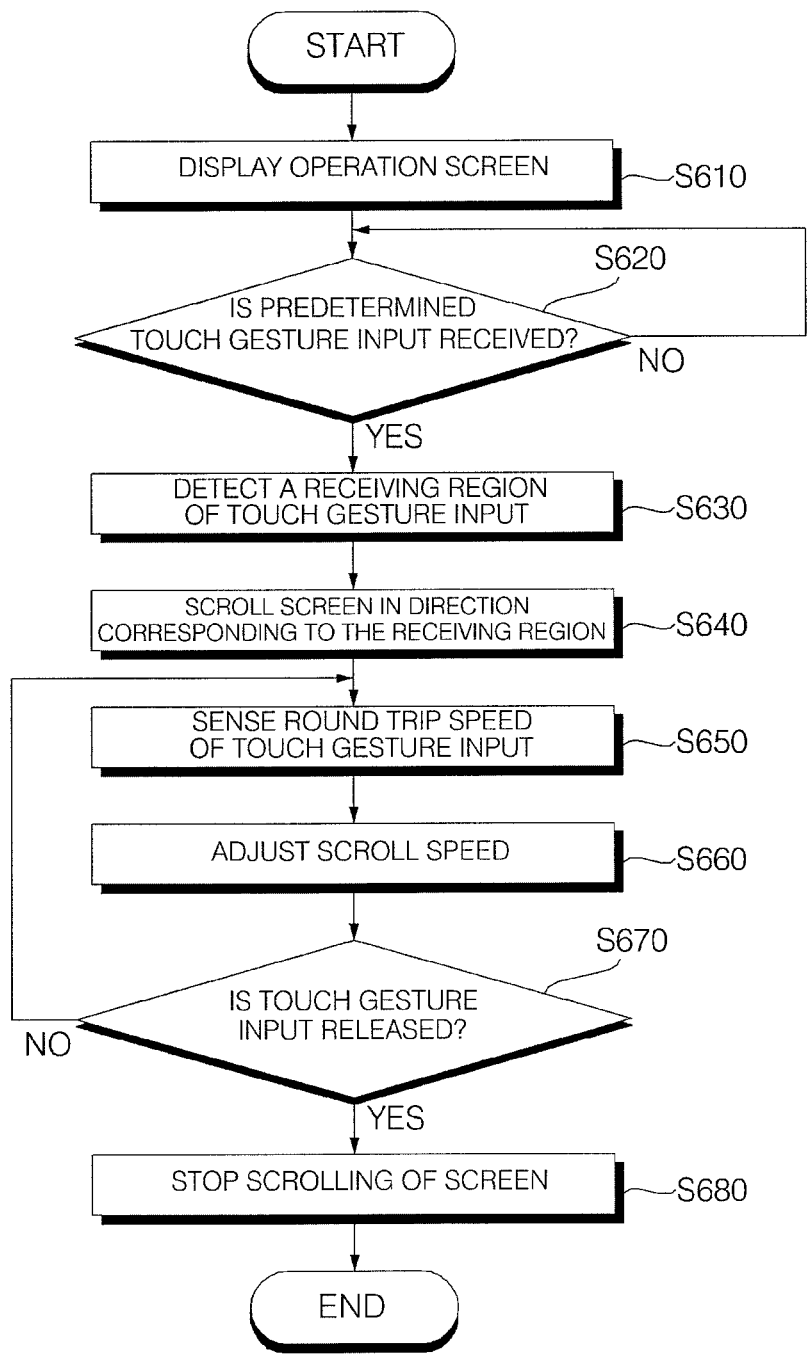
FIG. 6 is a flowchart illustrating an operation of a mobile terminal in accordance with a third embodiment of the present invention.

FIG. 6 is a flowchart illustrating an operation of a mobile terminal in accordance with a third embodiment of the present invention.

With reference to FIG. 6, the controller 180 displays an operation screen corresponding to a menu or an operation selected by a user command on the display unit 151 (Operation S610). Here, the operation screen displayed on the display unit 151 is a screen which is scrollable according to user input. For example, the operation screen may be an image/content/call/message/e-mail list screen, a broadcast screen, a map screen, a web page screen, or an execution screen of various applications.

Under the display state of the scrollable operation screen, if a predetermined touch gesture input is received through one region of the display unit 151 (Operation S620), the controller 180 detects a display region through which the touch gesture input is received (Operation S630). Thereafter, the controller 180 scrolls the operation screen in a direction corresponding to the detected display region (Operation S640). Such a screen scrolling operation may be continued while the touch gesture input is received.

That is, if a touch gesture input is received from the lower portion of the display unit 151, the controller 180 may scroll the operation screen in the downward direction. On the other hand, if touch gesture input is received from the upper portion of the display unit 151, the controller 180 may scroll the operation screen in the upward direction.

Here, the predetermined touch gesture input may be a gesture input of rubbing one region of the display unit 151 in the rightward and leftward directions, a gesture input of rubbing one region of the display unit 151 in the upward and downward directions, a gesture input of rubbing one region of the display unit 151 in a diagonal direction, or a gesture input of rubbing one region of the display unit 151 in arbitrary direction regardless of a specific direction, but the disclosure is not limited thereto.

When the screen scrolling operation is carried out, the controller 180 senses the round trip speed and/or the round trip distance of gesture input applied to the display unit 151 (Operation S650).

Thereafter, the controller 180 adjusts the screen scroll speed based on the sensed round trip speed of the touch gesture input (Operation S660). That is, the controller 180 may gradually decrease the screen scroll speed as the sensed round trip speed of the touch gesture input is decreased, and gradually increase the screen scroll speed as the sensed round trip speed of the touch gesture input is increased.

Further, the controller 180 may vary the scroll degree of the screen based on the sensed round trip distance of the touch gesture input. That is, the controller 180 may gradually decrease the scroll degree of the screen as the sensed round trip distance of the touch gesture input is decreased, and gradually increase the scroll degree of the screen as the sensed round trip distance of the touch gesture input is increased.

Thereafter, if the touch gesture input received through one point of the display unit 151 is released (Operation S670), the controller 180 stops scrolling of the operation screen (Operation S680). On the other hand, if the touch gesture input is not released, the controller 180 repeatedly performs the above Operations S650 and S660.

In accordance with another embodiment, the predetermined touch gesture input may be a gesture input of rubbing one region of the display unit 151 in the clockwise direction or counterclockwise direction. In this case, the scroll direction of the operation screen may be varied according to the rotating direction of the touch gesture input. That is, the operation screen may be scrolled in the downward direction according to the touch gesture input having the clockwise direction and be scrolled in the upward direction according to the touch gesture input having the counterclockwise direction.

As described above, the mobile terminal in accordance with the third embodiment scrolls the operation screen in a direction corresponding to a position where the predetermined touch gesture input is received, and varies the scroll speed of the operation screen according to the round trip speed of the touch gesture input, and may thus provide user convenience differentiated from conventional mobile terminals.

Figure 7:
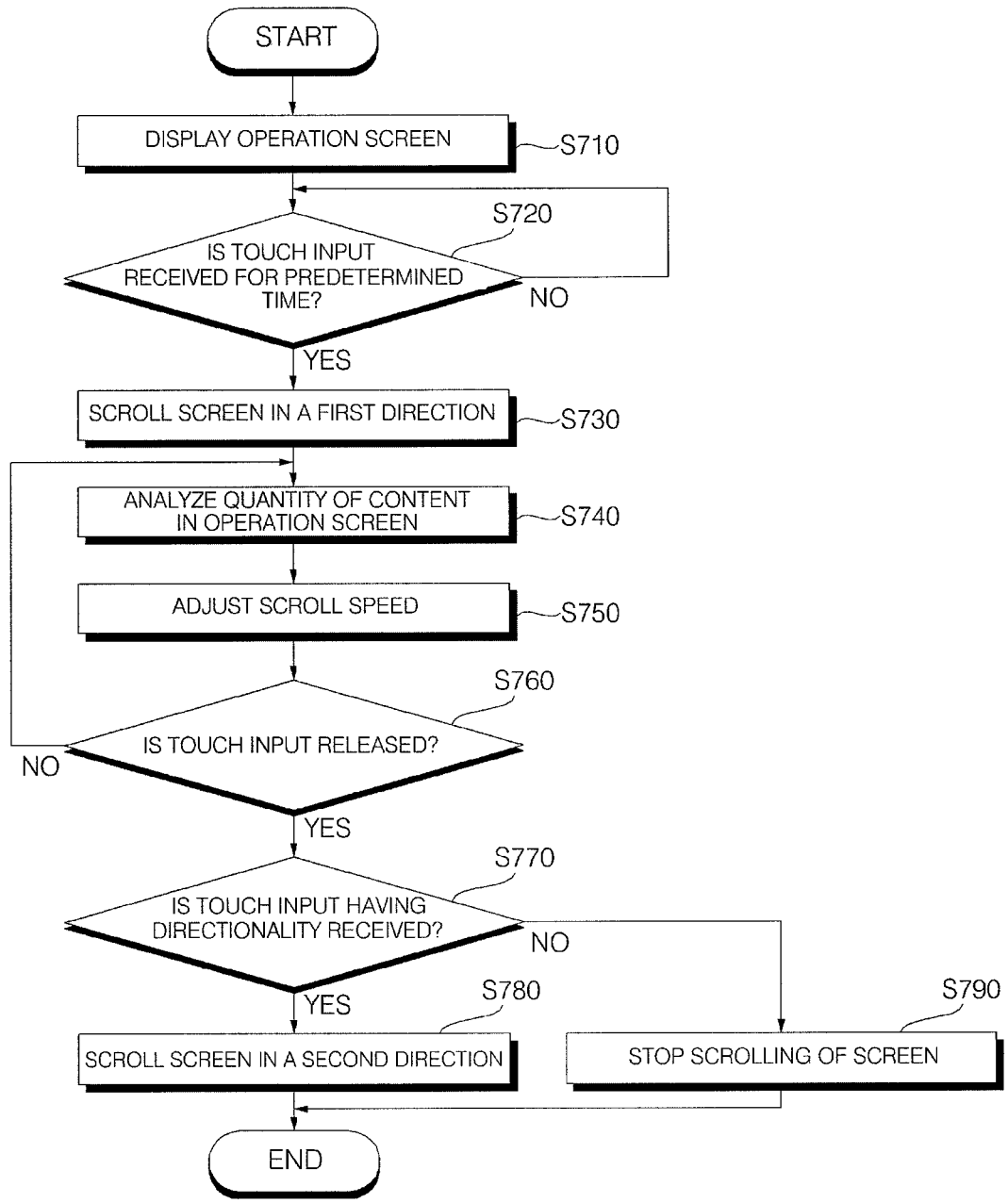
FIG. 7 is a flowchart illustrating an operation of a mobile terminal in accordance with a fourth embodiment of the present invention.

FIG. 7 is a flowchart illustrating an operation of a mobile terminal in accordance with a forth embodiment of the present invention.

With reference to FIG. 7, the controller 180 displays an operation screen corresponding to a menu or an operation selected by a user command on the display unit 151 (Operation S710). Here, the operation screen displayed on the display unit 151 is a screen which is scrollable according to user input. For example, the operation screen may be an image/content/call/message/e-mail list screen, a broadcast screen, a map screen, a web page screen, or an execution screen of various applications.

Under the display state of the scrollable operation screen, if user input of touching a point of the display unit 151 is received for a predetermined time (Operation S720), the controller 180 scrolls the operation screen in the downward direction (Operation S730). That is, if a long touch is received through an arbitrary point of the display unit 151, the operation screen may be scrolled in the downward direction. Such a screen scrolling operation may be continued while the long touch input is received.

When the screen scrolling operation is carried out, the controller 180 analyzes the quantity of content information included in the operation screen (Operation S740). Here, the content information may be image information and/or text information, etc., but is not limited thereto.

Thereafter, the controller 180 adjusts the screen scroll speed based on the analyzed quantity of content information. That is, the controller 180 may decrease the screen scroll speed as the quantity of content information on the operation screen increases, and increase the screen scroll speed as the quantity of content information on the operation screen decreases. By varying the scroll speed of the corresponding screen according to the quantity of content displayed on the operation screen, user legibility may be improved.

Further, when the screen scrolling operation is carried out, the controller 180 stores and learns a scroll speed of each operation screen mainly (or frequently) used by a user and may thus correct the current scroll speed to a scroll speed suitable for the user.

Thereafter, if the touch input received through one point of the display unit 151 is released (Operation S760), the controller 180 checks whether or not another touch input having directionality (i.e., flicking input or touch and drag input in a first direction) is received through the display unit 151 (Operation S770).

As a result of check of Operation S770, if another touch input having directionality is received through the display unit 151, the controller 180 scrolls the operation screen in the upward direction (Operation S780). On the other hand, as a result of check of Operation S770, if another touch input having directionality is not received through the display unit 151, the controller 180 stops the scrolling operation of the operation screen (Operation S790).

On the other hand, if the touch input received through one point of the display unit 151 is not released, the controller 180 repeatedly performs the above Operations S740 and S750.

As described above, the mobile terminal in accordance with the fourth embodiment scrolls the operation screen in the upward or downward direction according to a long touch input or a flicking input received through the display unit 151, and may thus provide user convenience differentiated from conventional mobile terminals.

Figure 8:
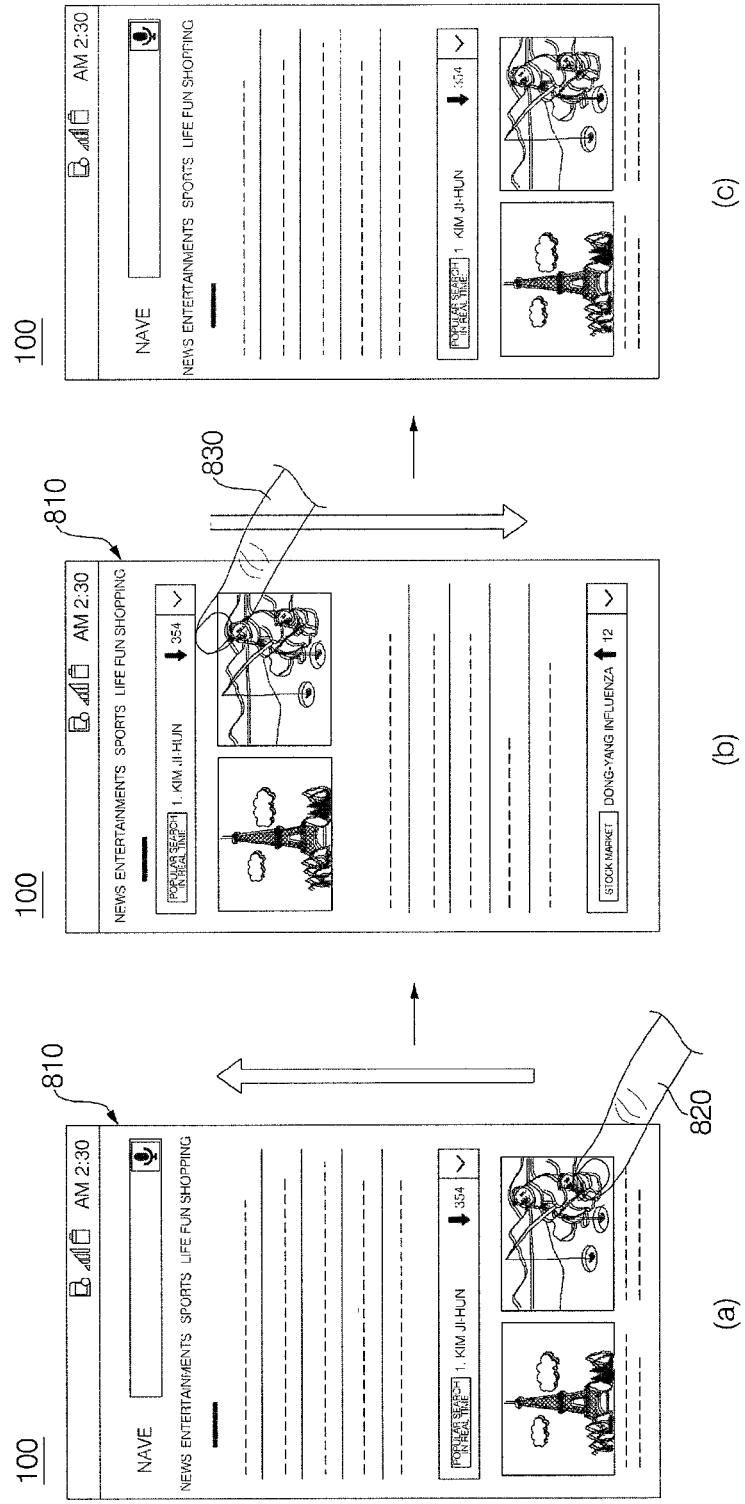
FIGS. 8 to 10 are reference views illustrating an operation of a mobile terminal in accordance with the first embodiment of the present invention.
Figure 9:
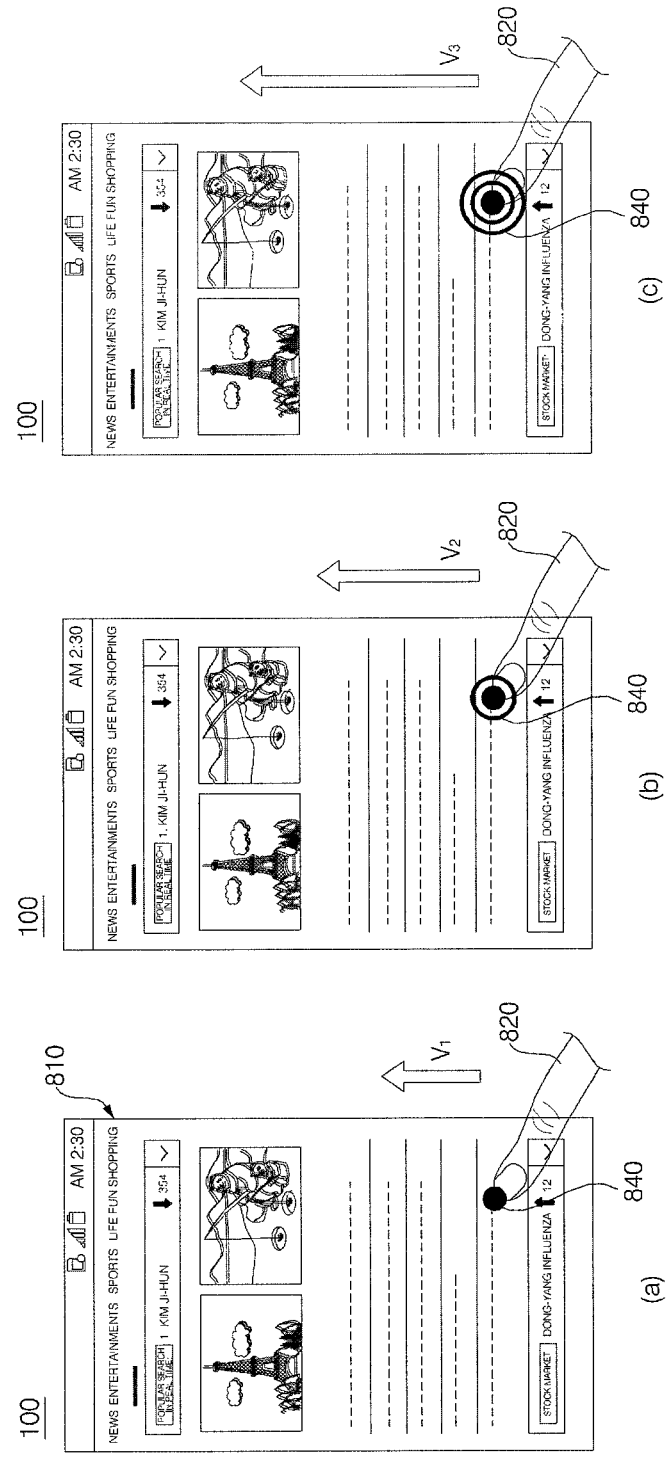
Figure 10:
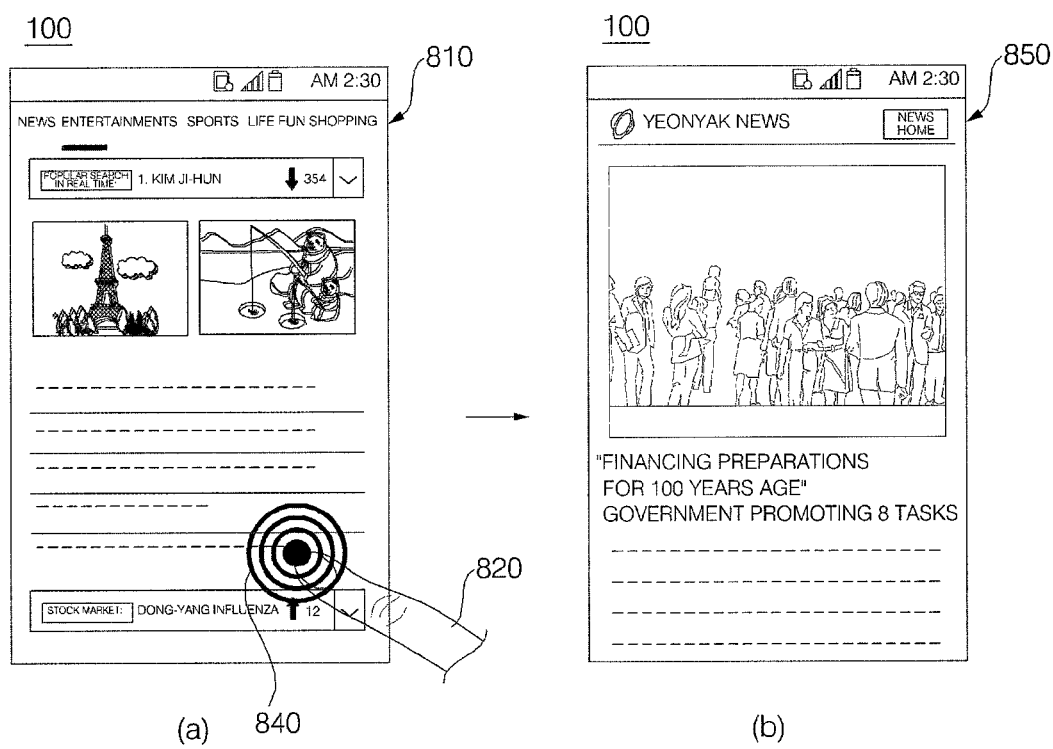

FIGS. 8 to 10 are reference views illustrating an operation of a mobile terminal in accordance with the first embodiment of the present invention.

With reference to FIGS. 8 to 10, the mobile terminal 100 may drive a web browser according to a user command and thus be connected to a specific web site. The mobile terminal 100 may display a web page screen 810, provided by the connected web site, on the display unit 151.

Under the display state of the web page screen 810, if a user input 820 of touching the lower portion of the display unit 151 for a predetermined time is received, the mobile terminal 100 may slowly scroll the web page screen 810 in the downward direction. Then, if the user touch input 820 is released, the mobile terminal 100 may stop the scrolling operation of the web page screen 810.

On the other hand, if a user input 830 of touching the upper portion of the display unit 151 for a predetermined time is received, the mobile terminal 100 may slowly scroll the web page screen 810 in the upward direction. In the same manner, if the user touch input 830 is released, the mobile terminal 100 may stop the scrolling operation of the web page screen 810.

When the screen scrolling operation is carried out, the mobile terminal 100 may sense the intensity of pressure of the touch input 820 applied to the display unit 151. Here, the intensity of pressure of the touch input 820 may be classified into a predetermined number of pressure levels. Hereinafter, in this embodiment, the intensity of pressure of the touch input will be classified into first to fourth pressure levels.

The mobile terminal 100 may display an intensity indicator 840 to indicate the sensed intensity of pressure of the touch input 820 at a point, through which the touch input 820 is received, or at a region adjacent to the point. Here, the intensity indicator 840 may be displayed as a scalloped circle (or a circular ripple), the diameter of which is gradually increased according to the intensity of pressure of touch input.

In accordance with another embodiment, the intensity indicator 840 may be displayed as a bar to indicate pressure levels through sizes, shapes or colors, or as a character or a number to indicate a pressure level, without being limited thereto. Thereby, a user may easily recognize the intensity of pressure of the touch input 820 through the intensity indicator 840 displayed on the display unit 151.

The mobile terminal 100 may adjust the screen scroll speed based on the sensed intensity of pressure of the touch input 820. That is, as exemplarily shown in FIG. 9, if pressure of a first level is applied to the display unit 161 through the user touch input 820, the mobile terminal 100 may scroll the web page screen 810 at a predetermined first speed ($V_1$).

Further, if pressure of a second level is applied to the display unit 161 through the user touch input 820, the mobile terminal 100 may scroll the web page screen 810 at a second speed ($V_2$) higher than the first speed ($V_1$). If pressure of a third level is applied to the display unit 161 through the user touch input 820, the mobile terminal 100 may scroll the web page screen 810 at a third speed ($V_3$) higher than the second speed ($V_2$).

That is, the mobile terminal 100 may gradually decrease the screen scroll speed as the sensed intensity of pressure of the touch input 820 is decreased and gradually increase the screen scroll speed as the sensed intensity of pressure of the touch input 820 is increased.

If the intensity of pressure of the touch input 820 reaches a predetermined critical value, the mobile terminal 100 may display the previous screen or the next screen of the current web page screen 810 on the display unit 151. Here, the critical value may be a pressure level having the highest intensity (i.e., the fourth pressure level) among a plurality of predetermined pressure levels but is not limited thereto.

As shown in FIG. 10, if the intensity of pressure of the touch input 820 received through the lower portion of the display unit 151 corresponds to the fourth pressure level, the mobile terminal 100 may display the next screen of the current web page screen 810 on the display unit 151. Further, if there is no previous or next screen of the current web page screen 810, the mobile terminal 100 may display a notification message (not shown) indicating that there is no corresponding screen on the display unit 151 for a designated time.

Figure 11A:
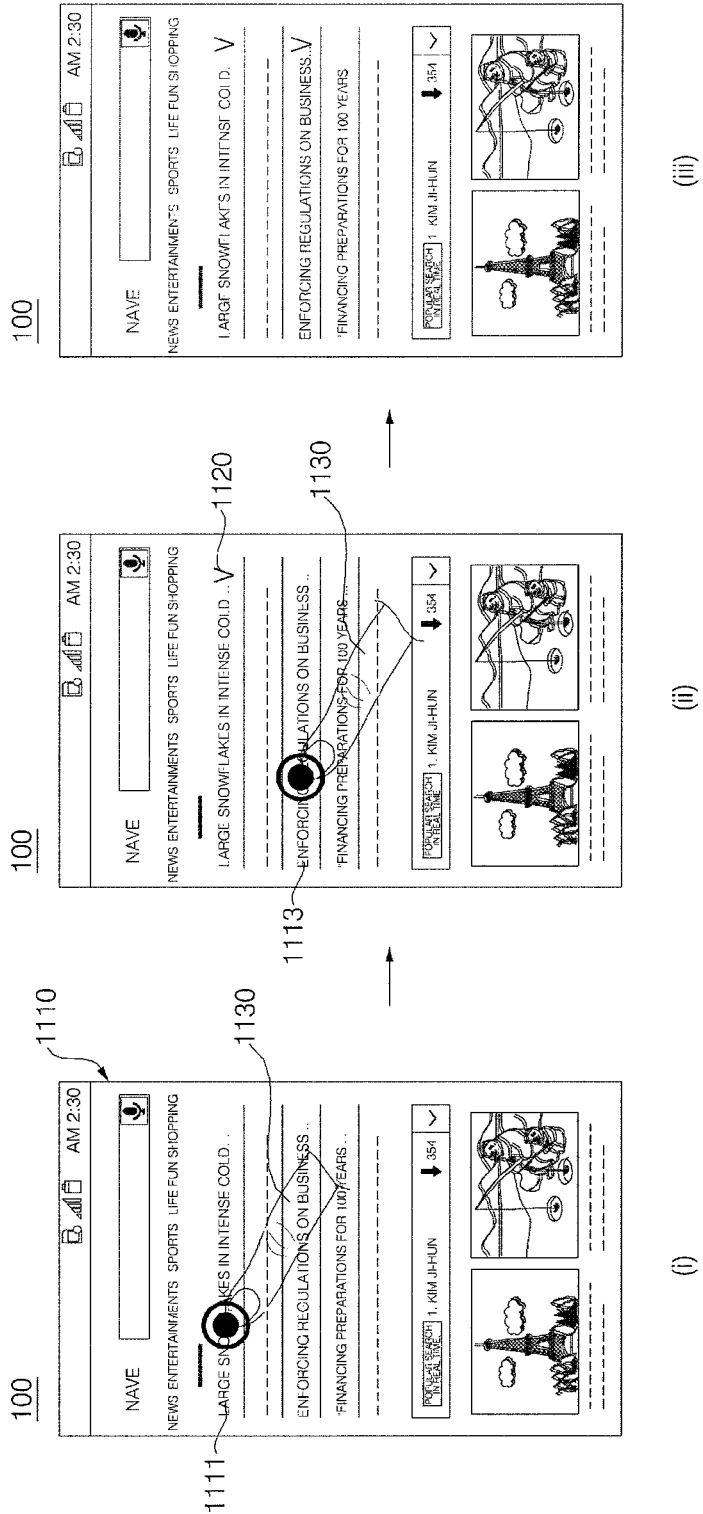
FIGS. 11a to 12 are reference views illustrating an operation of a mobile terminal in accordance with the second embodiment of the present invention.
Figure 11B:
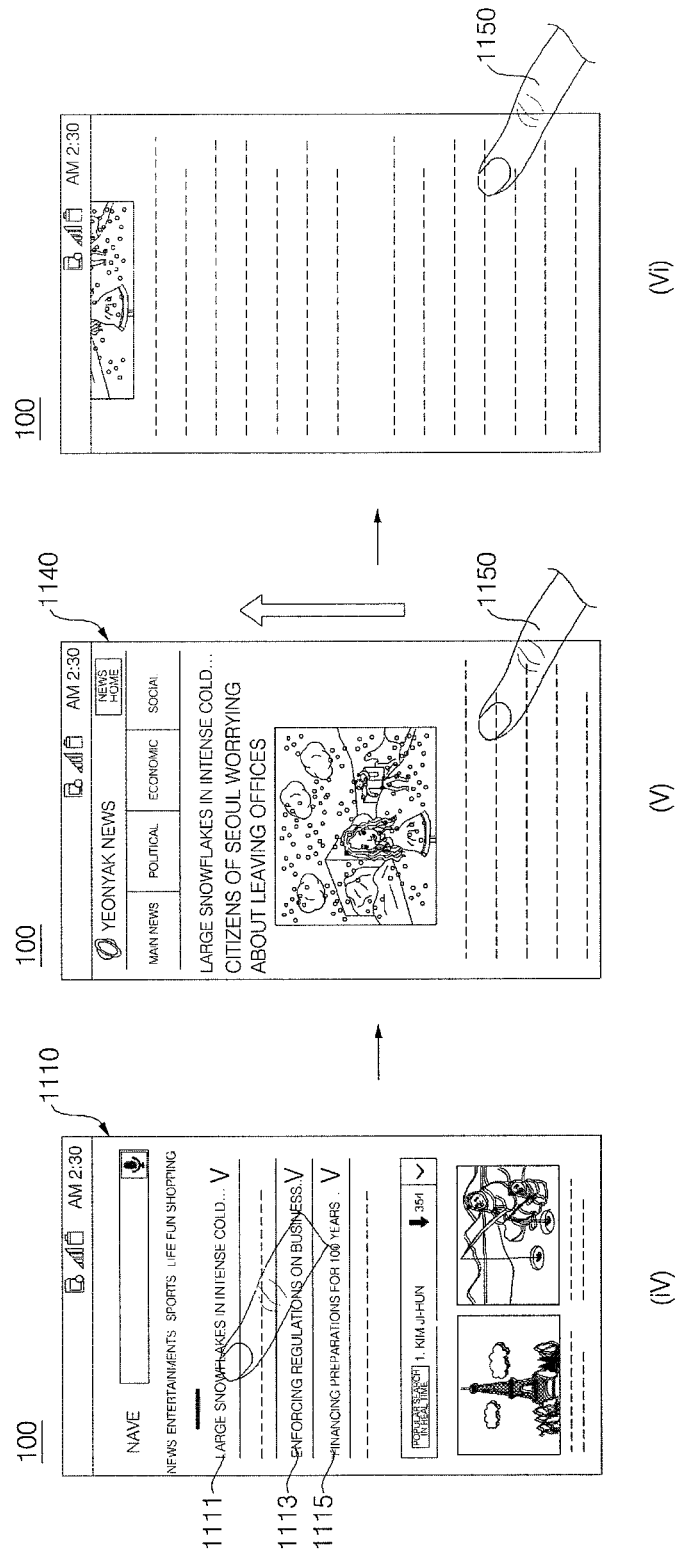
Figure 12:
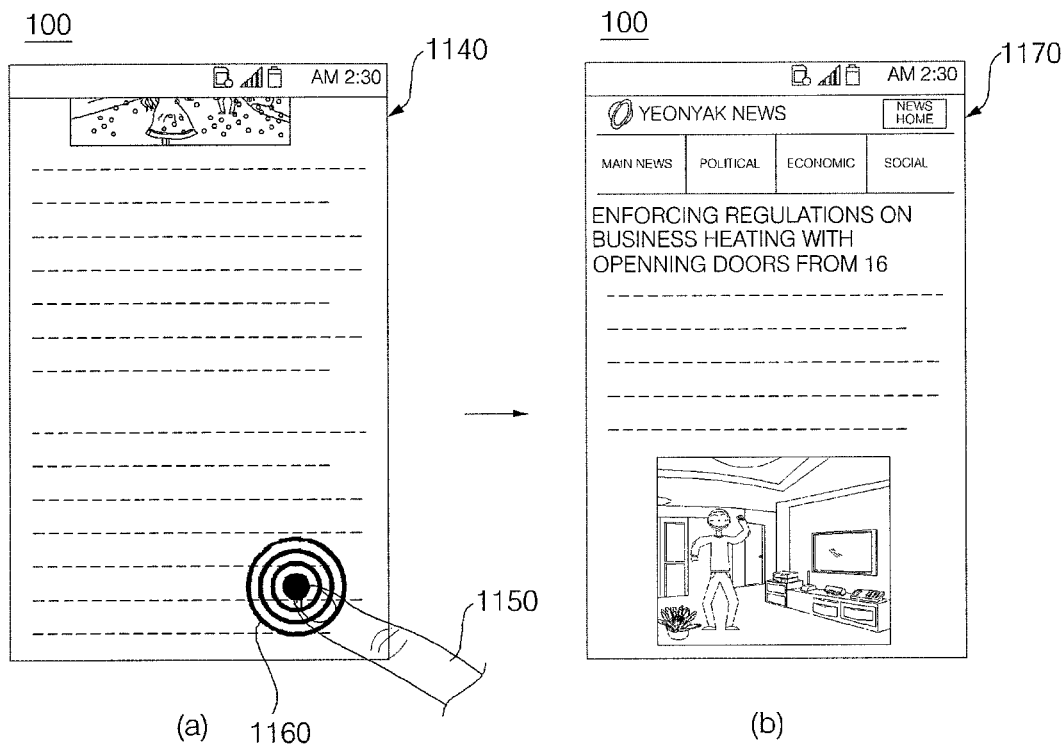

FIGS. 11*a* to 12 are reference views illustrating an operation of a mobile terminal in accordance with a second embodiment of the present invention.

With reference to FIGS. 11*a* to 12, the mobile terminal 100 may drive a web browser according to a user command and thus be connected to a specific portal site. The mobile terminal 100 may display a home page screen 1110, provided by the connected portal site, on the display unit 151.

Under the display state of the home page screen, if a pressure touch input 1130 is received through a first article item 1111, the mobile terminal 100 may set in advance the first article item 1111 as an article item to browse. Here, the mobile terminal 100 may highlight the first article item 1111 or display a predetermined indicator at the corresponding item 1111 so that a user may recognize that the corresponding item 111 is set as the article item to browse.

The mobile terminal 100 may additionally set a second article item 1113 and a third article item 1115 as article items to browse through such pressure touch input 1130.

If the first article item 1111 is selected from the set article items, the mobile terminal 100 may display a web page screen 1140 corresponding to the selected article item 1111 on the display unit 151.

Under the display state of the web page screen 1140, if user input 1150 of touching the lower portion of the display unit 151 is received for a predetermined time, the mobile terminal 100 may slowly scroll the web page screen 1140 in the downward direction.

When the screen scrolling operation is carried out, the mobile terminal 100 may sense the intensity of pressure of the touch input 1150 applied to the display unit 151. Here, the mobile terminal 100 may display an intensity indicator 1160 to indicate the sensed intensity of pressure of the touch input 1150 at a point, through which the touch input 1150 is received, or at a region adjacent to the point.

The mobile terminal 100 may adjust the screen scroll speed based on the sensed intensity of pressure of the touch input 1150. That is, the mobile terminal 100 may increase the screen scroll speed in proportion to the intensity of pressure of the touch input 1150.

If the intensity of pressure of the touch input 1150 gradually increases and then reaches a predetermined critical value, the mobile terminal 100 may display a web page screen corresponding to the previous article item or the next article item of the currently selected article item 1111 on the display unit 151. Here, the critical value may be a pressure level having the highest intensity (i.e., the fourth pressure level) among a plurality of predetermined pressure levels.

As shown in FIG. 12, if the intensity of pressure of the touch input 1150 received through the lower portion of the display unit 151 corresponds to the fourth pressure level, the mobile terminal 100 may display a web page screen 1170 corresponding to the next article item on the display unit 151.

On the other hand, if the intensity of pressure of touch input (not shown) received through the upper portion of the display unit 151 corresponds to the fourth pressure level, the mobile terminal 100 may display a web page screen (not shown) corresponding to the previous article item on the display unit 151. Here, the previous or next article item may be one of the article items set in advance through the pressure touch input 1130.

Figure 13:
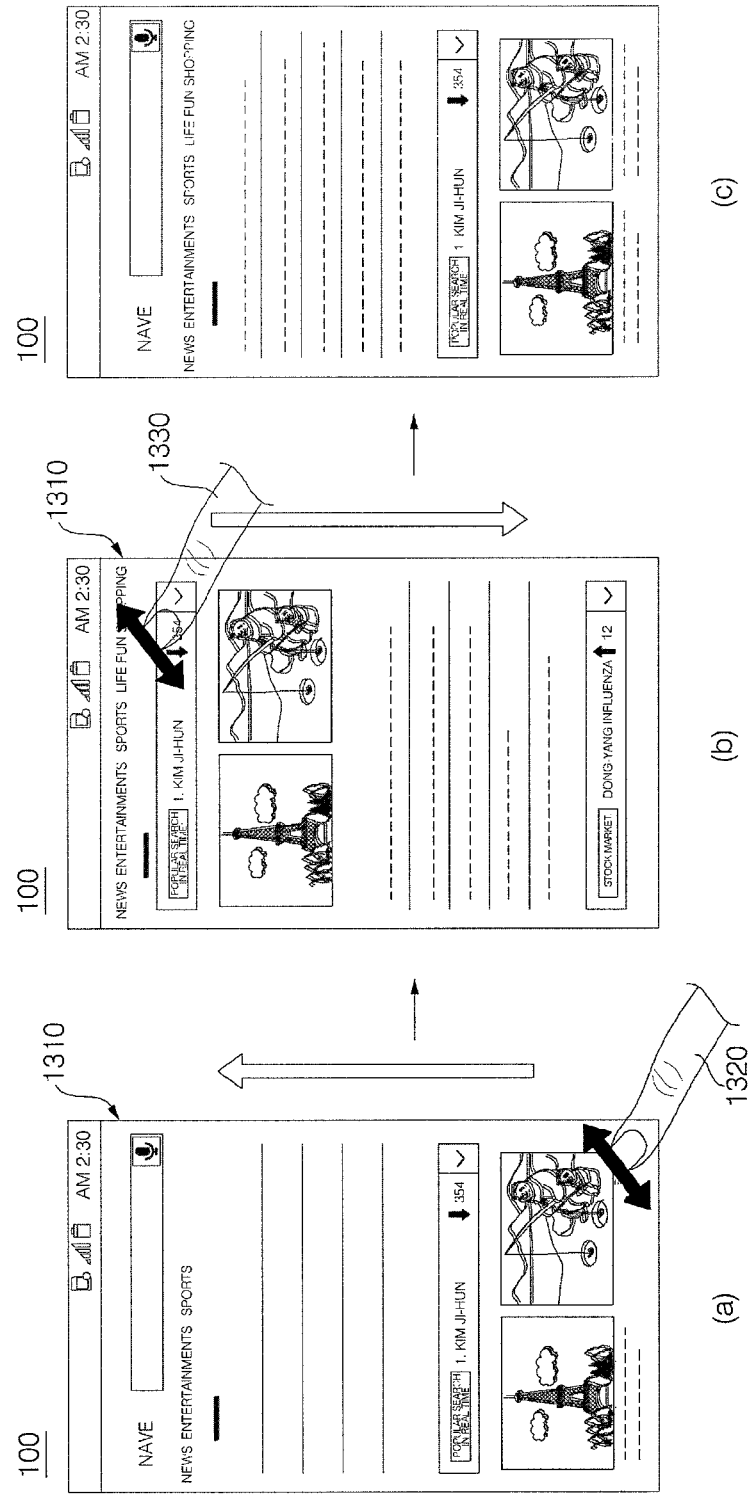
FIGS. 13 and 14 are reference views illustrating an operation of a mobile terminal in accordance with the third embodiment of the present invention.
Figure 14:
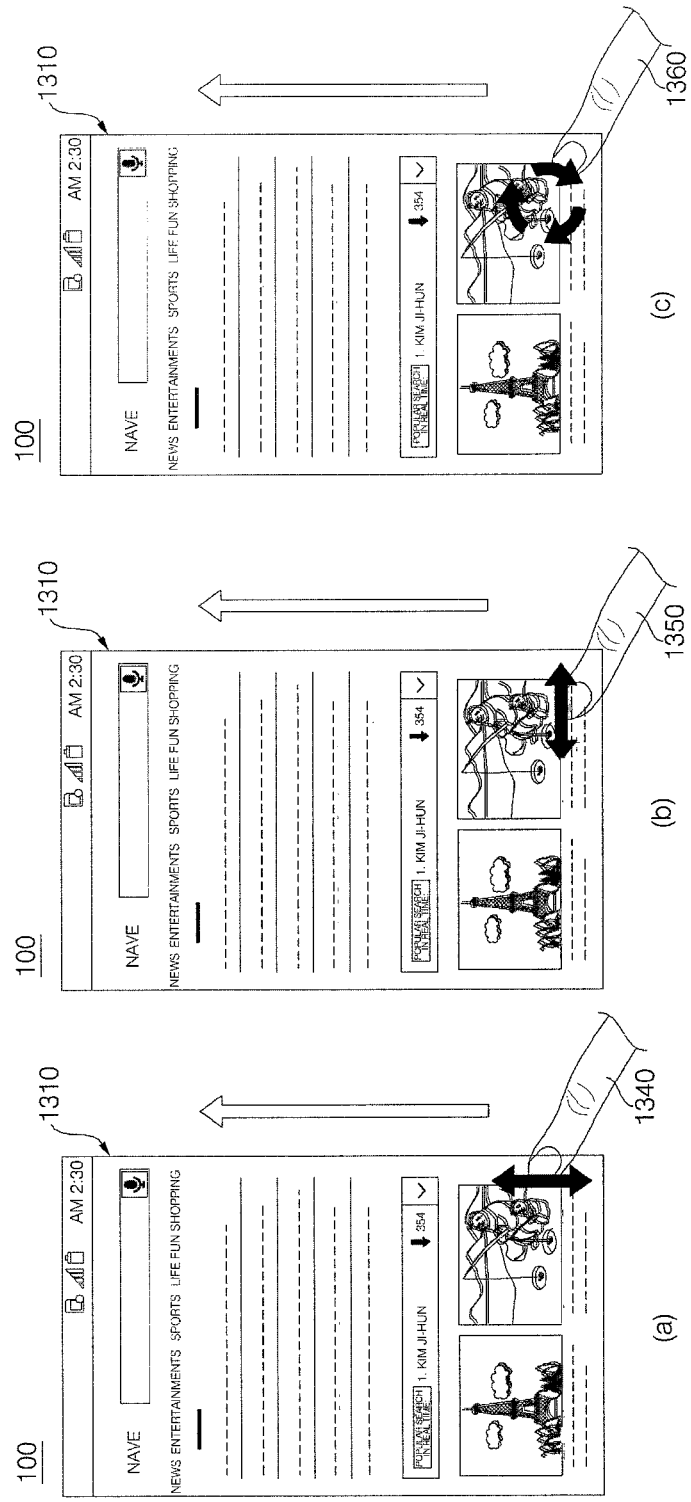

FIGS. 13 and 14 are reference views illustrating operation of a mobile terminal in accordance with the third embodiment of the present invention.

With reference to FIGS. 13 and 14, the mobile terminal 100 may drive a web browser according to a user command and thus be connected to a specific web site. The mobile terminal 100 may display a web page screen 1310, provided by the connected web site, on the display unit 151.

Under the display state of the web page screen 1310, if a touch gesture input 1320 of rubbing a lower region of the display unit 151 in a diagonal direction is received, the mobile terminal 100 may slowly scroll the web page screen 1310 in the downward direction.

On the other hand, if a touch gesture input 1330 of rubbing an upper region of the display unit 151 in a diagonal direction is received, the mobile terminal 100 may slowly scroll the web page screen 1310 in the upward direction. Such a screen scrolling operation may be continued while the touch gesture input 1320 or 1330 is received.

Although this embodiment exemplarily illustrates that the screen scrolling operation is executed in response to touch gesture input of rubbing the display unit 151 in a diagonal direction, the disclosure is not limited thereto. Therefore, it is understood by those skilled in the art that, even if any one of touch gesture input 1340 of rubbing one region of the display unit 151 in the upward and downward directions, touch gesture input 1350 of rubbing one region of the display unit 151 in the rightward and leftward directions, and touch gesture input 1360 of rubbing one region of the display unit 151 in the clockwise or counterclockwise direction is received, as exemplarily shown in FIG. 14, the same screen scrolling operation may be executed.

When the screen scrolling operation is carried out, the mobile terminal 100 may sense the round trip speed and/or the round trip distance of the touch gesture input 1320 applied to the display unit 151. Therefore, the mobile terminal 100 may adjust the scroll speed of the web page screen 1310 based on the round trip speed of the touch gesture input 1320 applied to the display unit 151. Further, the mobile terminal 100 may vary the scroll degree of the web page screen 1310 based on the round trip distance of the touch gesture input 1320.

Thereafter, if the touch gesture input 1320, 1330, 1340, 1350 or 1360 is released or a user action rubbing the display unit 151 by a finger is stopped, the mobile terminal 100 may stop the scrolling operation of the web page screen 1310.

Figure 15:
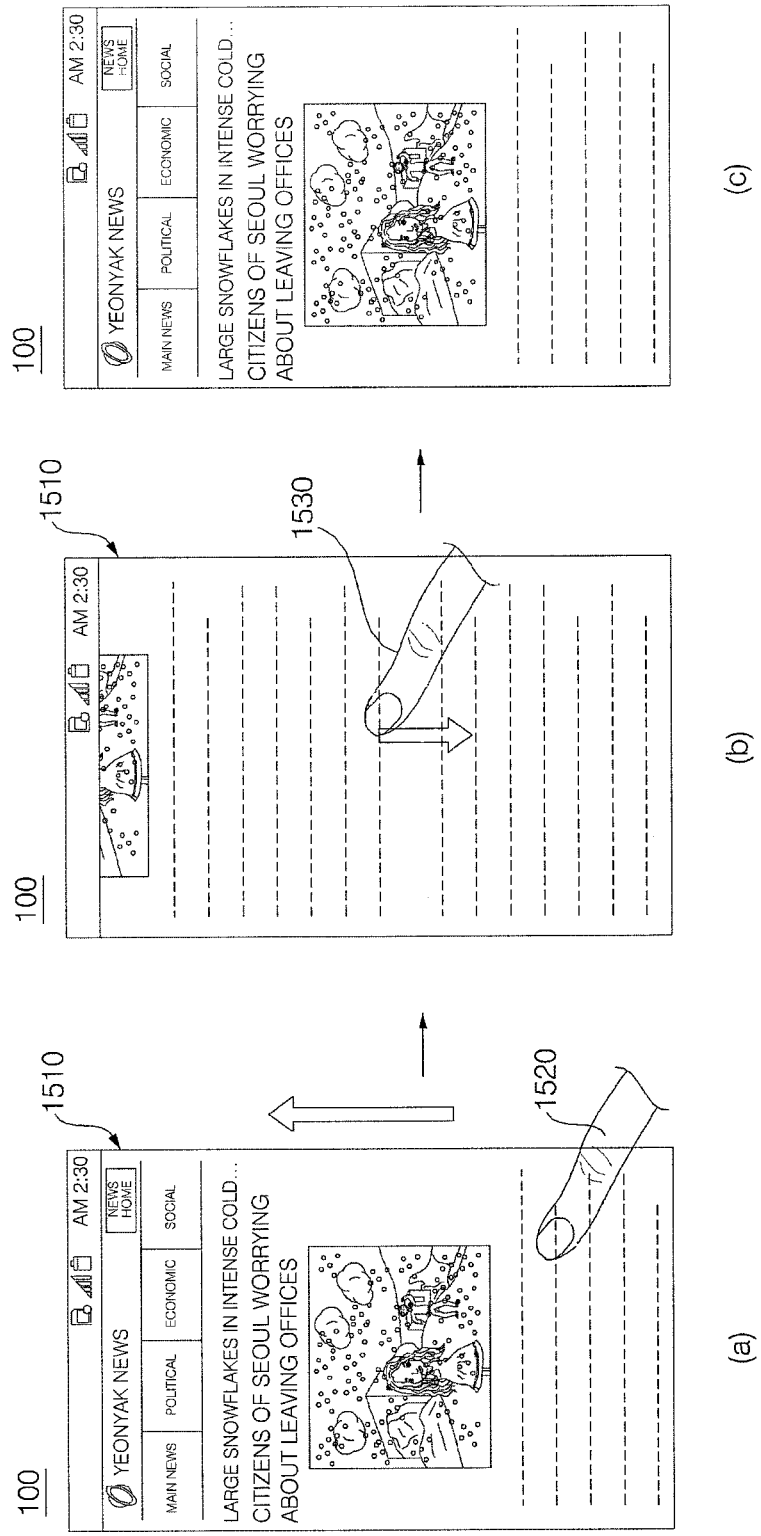
FIG. 15 is reference view illustrating an operation of a mobile terminal in accordance with the fourth embodiment of the present invention.

FIG. 15 is a reference view illustrating an operation of a mobile terminal in accordance with the fourth embodiment of the present invention.

With reference to FIG. 15, the mobile terminal 100 may drive a web browser according to a user command and thus be connected to a specific web site. The mobile terminal 100 may display a web page screen 1510, provided by the connected web site, on the display unit 151.

Under the display state of the web page screen 1510, if a user input 1520 of touching an arbitrary point of the display unit 151 for a predetermined time is received, the mobile terminal 100 may slowly scroll the web page screen 1510 in the downward direction. Such a screen scrolling operation may be continued while a long touch input 1520 of the user is received.

When the screen scrolling operation is carried out, the mobile terminal 100 may analyze the quantity of text information included in the web page screen 1510 and automatically adjust the scroll speed of the web page screen 1510. That is, the mobile terminal 100 may decrease the scroll speed of the web page screen 1510 as the quantity of text information in the web page screen 1510 increases, and increase the scroll speed of the web page screen 1510 as the quantity of text information in the web page screen 1510 decreases.

Thereafter, if the long touch input 1520 is released, the mobile terminal 100 may stop the scrolling operation of the web page screen 1510. Further, if a flicking input 1530 (or a touch and drag input) in the downward direction is received through one region of the display unit 151, the mobile terminal 100 may scroll the web page screen 1510 in the upward direction.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method for controlling a mobile terminal, the method comprising:
displaying a web page screen on a display unit, wherein the web page screen includes a plurality of article items, wherein each of the article items are distinct from one another and correspond to separate web page screens;
in response to a first touch input applied to a first article item of the plurality of article items, displaying a web page screen corresponding to the selected first article item;
in response to pressure touch inputs respectively applied to a first group of article items among the plurality of article items, setting the first group of article items as article items to browse and highlighting the first group of article items or displaying a predetermined indicator at each article item of the first group of article items;
in response to receiving a second touch input for a predetermined time on a location of the display unit and only in response to the location of the second touch input being vacant, scrolling via a controller, the web page screen in a direction corresponding to the location of the display unit where the second touch input is received;
sensing, via the controller, an intensity of pressure of the second touch input applied to the display unit while the web page screen is scrolled;
varying, via the controller, a scroll speed of the web page screen based on the sensed intensity of pressure of the second touch input, if the sensed intensity of pressure of the second touch input does not reach a predetermined threshold value;
in response to the second touch input reaching the predetermined threshold value, displaying another web page screen corresponding to a previous article item or a next article item among the first group of article items; and
displaying an indicator to indicate the sensed intensity of pressure of the second touch input on the display unit, wherein the indicator is displayed adjacent to the second touch input,
wherein scrolling the web page screen includes:
scrolling the web page screen in a leftward direction, in response to the second touch input being received through a left region of the display unit;
scrolling the web page screen in a rightward direction, in response to the second touch input being received through a right region of the display unit;
scrolling the web page screen in a downward direction, in response to the second touch input being received through a lower region of the display unit; and
scrolling the web page screen in an upward direction, in response to the second touch input being received through an upper region of the display unit.

2. The method according to claim 1, further comprising outputting a vibration pattern corresponding to the sensed intensity of pressure of the second touch input.

3. The method according to claim 1, further comprising varying a scroll speed of the web page screen according to a quantity of content included in the web page screen.

4. A mobile terminal comprising:
a display unit configured to display a web page screen, wherein the web page screen includes a plurality of article items, wherein each of the article items are distinct from one another and correspond to separate web page screens; and
a controller configured to:
in response to a first touch input applied to a first article item of the plurality of article items, display a web page screen corresponding to the selected first article item,
in response to pressure touch inputs respectively applied to a first group of article items among the plurality of article items, setting the first group of article items as article items to browse and highlighting the first group of article items or displaying a predetermined indicator at each article item of the first group of article items,
in response to a second touch input being received for a predetermined time at a location of the display unit only in response to the location of the second touch input being vacant, scroll the web page screen in a direction corresponding to the location of the display unit where the second touch input is received,
sense an intensity of pressure of the second touch input applied to the display unit while the web page screen is scrolled,
vary a scroll speed of the web page screen based on the sensed intensity of pressure of the second touch input, in response to the intensity of pressure of the second touch input being below a predetermined threshold value,
in response to the second touch input reaching the predetermined threshold value, display another web page screen corresponding to a previous article item or a next article item among the first group of article items, and
display an indicator to indicate the sensed intensity of pressure of the second touch input on the display unit, wherein the indicator is displayed adjacent to the second touch input,
wherein the controller is configured to scroll the web page screen in a leftward direction, in response to the second touch input being received through a left region of the display unit, scroll the web page screen in a rightward direction, in response to the second touch input being received through a right region of the display unit, scroll the web page screen in a downward direction, in response to the second touch input being received through a lower region of the display unit, and scroll the web page screen in an upward direction, in response to the second touch input being received through an upper region of the display unit.

5. The mobile terminal according to claim 4, further comprising a haptic module configured to output a vibration pattern corresponding to the sensed intensity of pressure of the second touch input.

6. The mobile terminal according to claim 4, wherein the controller is configured to vary a scroll speed of the web page screen according to a quantity of content included in the web page screen.

* * * * *